United States Patent
Vos et al.

(10) Patent No.: US 9,854,423 B2
(45) Date of Patent: Dec. 26, 2017

(54) SUBSCRIPTION AND CHARGING CONTROL FOR WIRELESS COMMUNICATIONS BETWEEN PROXIMATE DEVICES

(71) Applicant: Sierra Wireless, Inc, Richmond (CA)

(72) Inventors: Gustav Gerald Vos, British Columbia (CA); Steven John Bennett, British Columbia (CA)

(73) Assignee: Sierra Wireless, Inc., Richmond, British Columbia (CA)

( * ) Notice: Subject to any disclaimer, the term of this patent is extended or adjusted under 35 U.S.C. 154(b) by 606 days.

(21) Appl. No.: 13/757,413

(22) Filed: Feb. 1, 2013

(65) Prior Publication Data
US 2013/0203378 A1 Aug. 8, 2013

Related U.S. Application Data

(60) Provisional application No. 61/593,931, filed on Feb. 2, 2012.

(51) Int. Cl.
*H04W 4/24* (2009.01)
*H04M 15/00* (2006.01)
*H04W 48/18* (2009.01)

(52) U.S. Cl.
CPC ......... *H04W 4/24* (2013.01); *H04M 15/8044* (2013.01); *H04M 15/93* (2013.01); *H04W 48/18* (2013.01)

(58) Field of Classification Search
CPC ........ H04W 4/24; H04M 15/00; H04M 15/93
See application file for complete search history.

(56) References Cited

U.S. PATENT DOCUMENTS

| | | | |
|---|---|---|---|
| 5,956,636 | A | 9/1999 | Lipsit |
| 6,052,600 | A | 4/2000 | Fette et al. |
| 6,393,408 | B1 | 5/2002 | Mosher et al. |
| 6,622,017 | B1 | 9/2003 | Hoffman |
| 6,628,934 | B2 | 9/2003 | Rosenberg et al. |
| 6,636,489 | B1 | 10/2003 | Fingerhut |

(Continued)

FOREIGN PATENT DOCUMENTS

| | | |
|---|---|---|
| EP | 1703760 A2 | 9/2006 |
| EP | 2139180 A1 | 12/2009 |

(Continued)

OTHER PUBLICATIONS

FlashLinqTM :Discover your wireless sense. Research and Developments Projects. Qualcomm, downloaded Sep. 19, 2013.

(Continued)

*Primary Examiner* — Asghar Bilgrami
(74) *Attorney, Agent, or Firm* — Dennis A. Bennett; Brock Levin (57) ABSTRACT

A method and system for facilitating a controlled wireless communication relationship between a first device and a second device is provided. The wireless communication relationship is established at least in part via a portion of licensed radio spectrum. A remote validation server is contacted to obtain a validated authorization to use the portion of licensed radio spectrum for radio communication. Proof of the authorization between the first device and the second device is communicated. The first device and the second device subsequently enter into an authorized wireless communication relationship.

20 Claims, 5 Drawing Sheets

(56) References Cited

U.S. PATENT DOCUMENTS

| | | |
|---|---|---|
| 6,785,556 B2 | 8/2004 | Souissi |
| 6,792,271 B1 | 9/2004 | Sherman et al. |
| 6,871,063 B1 | 3/2005 | Schiffer |
| 6,934,544 B2 | 8/2005 | Cooper et al. |
| 6,961,567 B1 | 11/2005 | Kuhn |
| 6,961,712 B1 | 11/2005 | Perkowski |
| 6,985,931 B2 | 1/2006 | Dowling |
| 6,996,537 B2 | 2/2006 | Minear et al. |
| 7,035,595 B1 | 4/2006 | Kim et al. |
| 7,106,816 B2 | 9/2006 | Filipovic |
| 7,113,766 B2 | 9/2006 | Horel et al. |
| 7,319,870 B2 | 1/2008 | Olson et al. |
| 7,324,816 B2 | 1/2008 | Sherman et al. |
| 7,363,056 B2 | 4/2008 | Faisy |
| 7,448,080 B2 * | 11/2008 | Karjala ............... H04L 41/0806 379/901 |
| 7,917,133 B2 | 3/2011 | Payne et al. |
| 2002/0081992 A1 | 6/2002 | Keller et al. |
| 2002/0197991 A1 | 12/2002 | Anvekar et al. |
| 2003/0064723 A1 | 4/2003 | Thakker |
| 2003/0163350 A1 | 8/2003 | Rudowski et al. |
| 2004/0107241 A1* | 6/2004 | Jayapalan ............... H04L 12/14 709/203 |
| 2004/0210450 A1 | 10/2004 | Atencio et al. |
| 2005/0101323 A1 | 5/2005 | De Beer |
| 2005/0198534 A1* | 9/2005 | Matta ...................... G06F 21/31 726/5 |
| 2006/0063534 A1 | 3/2006 | Kokkonen et al. |
| 2006/0291483 A1 | 12/2006 | Sela |
| 2007/0078924 A1 | 4/2007 | Hassan et al. |
| 2007/0129078 A1 | 6/2007 | De Beer |
| 2007/0156588 A1 | 7/2007 | Howell et al. |
| 2008/0020760 A1 | 1/2008 | Elkarat et al. |
| 2008/0081611 A1 | 4/2008 | Hoyt et al. |
| 2008/0112308 A1 | 5/2008 | Cleveland |
| 2008/0188218 A1 | 8/2008 | Sherman et al. |
| 2008/0222711 A1* | 9/2008 | Michaelis .......... G07C 9/00039 726/7 |
| 2009/0154675 A1 | 6/2009 | Hanson |
| 2009/0158148 A1 | 6/2009 | Vellanki et al. |
| 2009/0163175 A1 | 6/2009 | Shi et al. |
| 2011/0151831 A1* | 6/2011 | Pattabiraman .......... H04L 12/14 455/405 |
| 2011/0258313 A1* | 10/2011 | Mallik .................. H04W 8/005 709/224 |
| 2011/0317569 A1* | 12/2011 | Kneckt .................... H04L 5/00 370/252 |
| 2012/0039323 A1 | 2/2012 | Hirano et al. |
| 2014/0075567 A1* | 3/2014 | Raleigh ................ H04W 12/10 726/26 |

FOREIGN PATENT DOCUMENTS

| | | |
|---|---|---|
| EP | 2161963 A1 | 3/2010 |
| WO | 9916281 A1 | 4/1999 |
| WO | 0213554 A1 | 2/2002 |
| WO | 2005043826 A1 | 2/2005 |
| WO | 2009053918 A1 | 2/2009 |
| WO | 2010030516 A2 | 3/2010 |
| WO | WO 2010/030515 | 3/2010 |
| WO | WO 2010/030516 | 3/2010 |

OTHER PUBLICATIONS

Qualcomm Press Release: Qualcomm to Demonstrate New Peer-to-Peer Technology at Mobile World Congress, downloaded Sep. 19, 2013.
"Smart Cards: UICC Application Programming Interface and Loader Requirements; Service Description; (Release 6)" Technical Specification ETSI TS 102 240 (V6.0.0), European Telecommunications Standards Institute, Sophia Antipolis, France, Jul. 2002, 18 pgs.
3GPP TSG-SA1 #55 S1-112411 "Study on Proximity-based Services" http://www.3gpp.org/ftp/tsg_sa/WG1_Serv/TSGS1_55_Dublin/docs/S1-112411.zip.
3GPP TSG-SA WG1 Meeting #57. Huawei (Laurence. meriau@huawei.com) "Distinction between service and proximity discovery". Disclosed on the email reflector on or about Jan. 11, 2012 and brought forward as relevant by inventor.
3GPP TS 22.259 v1.0.0 (Oct. 2005) "Service Requirements for Personal Network Management".
Extended European Search Report for European Application No. 13743844.6; dated Dec. 4, 2015.

* cited by examiner

SUBSCRIPTION AND CHARGING CONTROL
FOR WIRELESS COMMUNICATIONS
BETWEEN PROXIMATE DEVICES

CROSS-REFERENCE TO RELATED
APPLICATIONS

This application claims the benefit and priority of U.S. Provisional Application 61/593,931, filed Feb. 2, 2012. The foregoing application is incorporated by reference herein in its entirety.

FIELD OF THE TECHNOLOGY

The present technology pertains in general to wireless communications and in particular to subscription and charging control for wireless communications between proximate devices.

BACKGROUND

There are a variety of communication standards facilitating direct wireless communication between nearby devices, such as IEEE 802.11 (Wi-Fi™), IEEE 802.15.4 (ZigBee™), and Bluetooth™. However, typically such standards are limited to communication via unlicensed radio spectra, such as the ISM (Industrial, Scientific and Medical) bands. Communication in the ISM bands can be problematic due to government-mandated limitations such as power limitations, and also due to crowding in some areas as wireless devices become more ubiquitous.

In such situations, device-to-device communication quality could be improved by allowing devices to communicate via frequency bands otherwise reserved for use by entities holding a license to those bands, such as mobile network operators (MNOs). However, it is desirable for licensees to retain control over wireless communications in these bands, in order that the licensed spectrum is appropriately managed.

A Third Generation Partnership Project (3GPP™) work item entitled "Study on Proximity-based Services," dated August, 2011, and available at:

http://www.3gpp.org/ftp/tsg_sa/WG1_Serv/
TSGS1_55_Dublin/docs/S1-112411.zip, discloses a need for discovery and communication between proximate wireless devices, and identifies a deficiency in current 3GPP specifications, that all traffic and signalling has to be routed in the wireless 3GPP network. However, this document does not disclose details on how such a need is to be filled while respecting the rights and needs of spectrum licensees.

Therefore there is a need for a method and system for subscription and charging control for wireless communications between proximate devices, that is not subject to one or more limitations of the prior art.

This background information is provided for the purpose of making known information believed by the applicant to be of possible relevance to the present technology. No admission is necessarily intended, nor should be construed, that any of the preceding information constitutes prior art against the present technology.

SUMMARY OF THE TECHNOLOGY

An object of the present technology is to provide subscription and charging control for wireless communications between proximate devices. In accordance with an aspect of the present technology, there is provided a method for establishing a wireless communication relationship between a first device and a second device, the wireless communication relationship established at least in part via a portion of licensed radio spectrum, the method comprising: contacting a remote validation server to obtain a validated authorization to use the portion of licensed radio spectrum for radio communication; communicating proof of the authorization between the first device and the second device; and causing the first device and the second device to enter into the wireless communication relationship.

In accordance with another aspect of the present technology, there is provided a system for facilitating a controlled wireless communication relationship between wireless devices, the system comprising: a first wireless device configured for wireless communication at least in part via a portion of licensed radio spectrum; a second wireless device configured for wireless communication with the first wireless device at least in part via the portion of licensed radio spectrum; a remote validation server associated with a licensed radio spectrum stakeholder, the validation server configured to receive, evaluate and respond to validation requests from the first wireless device and the second wireless device; the first and second wireless devices further configured to: contact the remote validation server to obtain validated authorizations to use the portion of licensed radio spectrum for radio communication; communicate proof of the authorization between the first device and the second device; and enter into the controlled wireless communication relationship upon obtaining the validated authorization and communicating said proof of the authorization.

BRIEF DESCRIPTION OF THE FIGURES

These and other features of the technology will become more apparent in the following detailed description in which reference is made to the appended drawings.

DETAILED DESCRIPTION OF THE
TECHNOLOGY

Definitions

The term "local wireless communication link" refers to a wireless communication link by which at least two devices can communicate by radio signaling, without use of an intermediate cellular communication network to relay messages between the linked devices. A local wireless communication link between two devices may utilize other local devices, such as other user equipment in the local area, as repeaters or relays, but does not route communications through enterprise devices such as cellular base stations, mobile operator core networks, evolved Node B's, or the like.

The term "direct wireless communication link" refers to a wireless communication link in which the linked devices can communicate directly with each other, for example without use of an intermediate device or intermediate network such as a cellular communication network to relay messages between the linked devices.

As used herein, the term "about" refers to a +/−10% variation from the nominal value. It is to be understood that such a variation is always included in a given value provided herein, whether or not it is specifically referred to.

Unless defined otherwise, all technical and scientific terms used herein have the same meaning as commonly understood by one of ordinary skill in the art to which this technology belongs.

An aspect of the present technology provides a method for establishing a wireless communication relationship between a first device and a second device, the wireless communication relationship established at least in part via a portion of licensed radio spectrum, the method comprising: contacting a remote validation server to obtain a validated authorization to use the portion of licensed radio spectrum for radio communication; communicating proof of the authorization between the first device and the second device; and causing the first device and the second device to enter into the wireless communication relationship.

Another aspect of the present technology provides a system for facilitating a controlled wireless communication relationship between wireless devices, the system comprising: a first wireless device configured for wireless communication at least in part via a portion of licensed radio spectrum; a second wireless device configured for wireless communication with the first wireless device at least in part via the portion of licensed radio spectrum; a remote validation server associated with a licensed radio spectrum stakeholder, the validation server configured to receive, evaluate and respond to validation requests from the first wireless device and the second wireless device; the first and second wireless devices further configured to: contact the remote validation server to obtain validated authorizations to use the portion of licensed radio spectrum for radio communication; communicate proof of the authorization between the first device and the second device; and enter into the controlled wireless communication relationship upon obtaining the validated authorization and communicating said proof of the authorization.

Embodiments of the present technology facilitate communication between proximate wireless devices, for example via a local and/or direct wireless communication link, using licensed radio spectrum. Such local and/or direct wireless communication may be provided in accordance with 3GPP™ services such as Proximity Service (ProSe) or LTE Direct, for example. Such local and/or direct wireless communication over licensed spectrum may be used as an alternative to wireless communication over unlicensed, for example Personal Area Networks and Local Area Networks using unlicensed spectrum in the ISM bands. Wireless communication over licensed spectrum may be of improved quality, since there may be less radio interference, the radio environment may be more tightly managed, and/or power limitations may not be as strict.

Improved communication quality may comprise one or more of: improved signal-to-interference ratio, improved signal-to-noise ratio, reduced transmission power requirements to provide adequate signal strength, increased link speed, increased bandwidth, decreased channel coding requirements, reduced potential for collisions, or the like, or a combination thereof.

Embodiments of the present technology may be used by entities wishing to retain an element of control over wireless communications, for example direct or substantially direct communications between proximate devices, occurring via radio spectrum to which those entities hold a license. Control may be desired, for example, in order to ensure that licensed spectrum is appropriately managed for the licensee. To this end, embodiments of the present technology may employ a monetary mechanism, such as a subscription and/or pay-for-use mechanism, by which spectrum license holders or sub-licensees control access to their radio spectra. Entities such as MNOs may set prices, add, decline to add, or remove subscriptions, or the like, in order to appropriately manage the spectrum. Access control may be based at least in part on location or region. Management of spectrum may be required, for example, to cover spectrum licensing costs or to "clean up" spectrum in certain areas where interference is encountered or anticipated.

The present technology may be used by spectrum licensees to create a revenue stream by providing, for an appropriate fee, access to radio spectral resources to which the licensees hold usage rights.

In accordance with embodiments of the present technology, some devices may be configured with subscriptions that only permit them to communicate with devices that are configured to cover all or the bulk of the communication costs levied by the spectrum licensee or other stakeholder. For example, low-cost sensor or endpoint devices may hold low-cost subscriptions allowing them to be discovered by and communicate only with devices holding relatively premium subscriptions, such as gateway devices. As another example, low-cost sensor or endpoint devices may communicate with a second device only upon setup of an arrangement in which the second device agrees to pay all or the bulk of the communication costs.

Embodiments of the present technology may be used to facilitate communication between, to and/or from machine-type devices such as wireless utility meters, sensors, actuators, and the like. Sensors may include, for example, video or audio devices, motion sensors, light sensors, temperature sensors, home automation devices, or the like. Actuators may include, for example, door openers, light switches, appliance controls, ventilation controls, alarm actuators, or the like. In some embodiments, by way of the present technology, a user device such as a mobile phone may be made to communicate and interact with such machine-type devices.

In embodiments of the present technology, a device may be capable of communication via both unlicensed spectrum and licensed spectrum. In one embodiment, communication via unlicensed spectrum may be used when feasible, and the device may switch to communication via licensed spectrum when necessary. In one embodiment, the device may be configured to communicate via both licensed and unlicensed spectrum when necessary, for example to provide increased bandwidth. For example, the device may switch from unlicensed to licensed spectrum when interference degrades the unlicensed communication band to below a predetermined threshold.

Embodiments of the present technology provide a mechanism by which devices such as mobile terminals can determine whether to establish and/or accept a connection with another candidate device or to refrain from connecting with said other candidate device. In some embodiments, a candidate device's type is determined prior to establishing a connection therewith. If the candidate device's type is recognized by the first device as being a type to which the first device has authorization to connect with, then a connection may proceed. Otherwise, establishing of the connection is inhibited.

In some embodiments, a device may broadcast its type or classifications of potential connections, and a potentially responding device is configured to respond if and only if it is authorized to do so (for example via preconfiguration) for at least one of the broadcast type or classifications. In some embodiments, this reduces the amount of unnecessary traffic from devices, for example trying to set up connections and then disconnecting unwanted connections.

In some embodiments, for example for a wireless sensor network or site automation network, various wireless sensors may be configured to respond only to a narrow set of classifications. In some embodiments, for example in the case of a smartphone or other mobile user equipment, user selection input may be accepted to restrict the device to only allow connections from a calling party's device, where the calling party has agreed to pay for the connection.

Subscription Types

In some embodiments, a device may be provided with a subscription selected from a variety of subscription types. Each of the variety of subscription types may confer different rights or capabilities to the device. Each of the variety of subscription types may be priced differently. For example, some subscription types may be free, while others may cost a predetermined amount of money. In some embodiments, the configuration of the subscription provided to the device may be chosen by a MNO and/or the end user.

In some embodiments, an available subscription type, termed herein "Discoverable Only", allows the device holding the subscription to be discovered, but does not confer to it the ability to discover other devices, such as other user equipment or gateway devices. Therefore, the device may never transmit (i.e. use licensed network resources) unless it receives an adequate discovery request first. For example, in some embodiments, an adequate discovery request is one containing a specific authorization to discover devices with Discoverable Only subscriptions.

In some embodiments, an available subscription type, termed herein "Restricted Discoverable", allows the device holding the subscription to be discovered, but does not confer to it the ability to discover other devices, such as other user equipment or gateway devices. Therefore, the device may never transmit (i.e. use licensed network resources) unless it receives an adequate discovery request first. For example, in some embodiments, an adequate discovery request is one containing a specific authorization to discover devices with "Restricted Discoverable" subscriptions. In some embodiments, the full or partial cost of discovery will be paid by the device which initiated discovery. In some embodiments, a user and/or MNO may choose to configure its device as "Discoverable Only" to possibly avoid discovery charges.

In some embodiments, an available subscription type, termed herein "Discover All", allows the device holding the subscription to send out discovery requests to other devices that have Discovery Subscriptions and/or Discoverable Only Subscriptions. In some embodiments, if discovery is made to a UE with a Discoverable Only Subscription, an additional cost per discovery may apply. Such a device may also be discovered by other UE's with a valid subscription.

In some embodiments, an available subscription type, termed herein "Discover", allows the device holding the subscription to send out discovery requests to other devices that have Discovery Subscriptions. Such a device may not discover devices with a Discoverable Only Subscription. Such a device may also be discovered by other UE's with a valid subscription.

In some embodiments, an available subscription type, termed herein "Direct Access", allows the device holding the subscription to send/receive data via licensed spectrum, for example via a LTE Direct PAN service, to another device with a Direct Access Subscription.

In some embodiments, an available subscription type, termed herein "Extended Direct Access", allows the device holding the subscription to send/receive data via licensed spectrum, for example via a LTE Direct PAN service, to another device with or without a Direct Access Subscription. In some embodiments, communications to a device without a Direct Access Subscription may be charged at a different rate than communications to a device with a Direct Access Subscription.

In some embodiments, an available subscription type, termed herein "Restricted Direct Access", allows the device holding the subscription to send/receive data via licensed spectrum, for example via a LTE Direct PAN service, to only a device which holds an "Extended Direct Access" subscription. In some embodiments, communications charges may be fully or partially paid for by the device with the "Extended Direct Access" subscription. In some embodiments, a user and/or MNO may choose to configure its device as "Restricted Direct Access" to possibly avoid access charges.

In some embodiments, through the configuration of various subscription types, the operator can control charging for the event of discovering a device and the event for being discovered where the charges may be charged fully or partially to one of the devices participating in the discovery. In various embodiments, charges levied against one device may therefore be more than charges levied against another device.

In some embodiments, through the configuration of various subscription types, the operator can control charging for receive access and transmit access where the charges may be charged fully or partially to one of the devices participating in the communications.

Various other subscription types may also be provided, for example by combining two or more subscription types as described above. For example, a subscription type may allow a device to be discoverable an unlimited number of times, while also being able to initiate a limited number of discovery requests. As another example, a subscription type may allow a device to initiate a limited number of discovery requests, except for predetermined devices (such as devices made by the same manufacturer), for which the number of discovery requests is unlimited.

In some embodiments, "Access-type" subscriptions such as "Direct Access" and "Extended Direct Access" subscriptions may govern data communication capabilities, while "Discovery-type" subscriptions, such as "Discover," "Discover All" and "Discoverable Only" subscriptions may govern behaviour during discovery operations. In some embodiments, therefore, a device may be afforded both an "Access-type" subscription and a "Discovery-type" subscription, thereby specifying both data discovery capabilities and data communication capabilities. In some embodiments, in the absence of one or both types of subscriptions, a device may be afforded a certain default set of capabilities, for example minimal capabilities. In some embodiments, a device with a "Discovery-type" subscription may be configured, via the subscription, to discover other devices with pre-specified subscription types.

In some embodiments, various gradations of "Access-type" subscriptions and/or "Discovery-type" subscriptions may be provided, and a requirement may be imposed that only certain combinations of device subscriptions are authorized to work together. As an illustrative example, there may be 10 grades of "Access-type" subscription, with grades 1 to 5 being capable of responding to discovery requests but not able to make discovery requests, and grades 6 to 10 being capable of making and responding to discovery requests. Higher subscription grades cost more to purchase. Alternatively, another number of grades may be available, and each grade may be given a descriptive name. The imposed requirement in the present example may be that two devices may discover each other if their combined grades add to at least 11. Thus, a grade 10 device can discover any device holding a grade 1 or higher subscription. A grade 6 device may transmit discovery requests, but these requests may be ignored or otherwise blocked by all devices which hold a subscription of grade 4 or less. Other variations may also be present. For example, a device with a low grade subscription may at least temporarily operate as if it had a higher grade subscription, but this may cause the subscription to run out faster. An insufficient subscription grade may generate a user prompt inviting them to pay for an upgraded subscription.

As another example, "Discoverable Only" subscriptions may be assigned a grade of 1, "Discover" subscriptions may be assigned a grade of 2, and "Discover All" subscriptions may be assigned a grade of 3. The imposed requirement in this example may be that two devices may discover each other if their combined grades add to at least 4.

As yet another example, "Direct Access" subscriptions may be assigned a grade of 1, and "Donor Direct Access" subscriptions may be assigned a grade of 2. Devices without a Direct Access subscription are assigned a grade of 0. The imposed requirement in this example may be that two devices may transfer data to each other if their combined grades add to at least 2.

In various embodiments, applicable subscription costs may be payable in a one-time payment, on a periodic basis, for example a monthly basis, on a usage basis, on a pay-as-you-go basis, or the like, or a combination thereof.

In one embodiment, a subscription may grant the device the right to make a predetermined number of discoveries, be discoverable a predetermined number of times, or the like, or a combination thereof.

In one embodiment, a subscription may grant predetermined rights to the device for the lifetime of the device, in exchange for a one-time payment, for example made by a device provider before providing the device to an end user, or made by the end user.

In one embodiment, a subscription may allow for up to a predetermined or unlimited amount of data to be transferred, costed out at a flat monthly rate or a rate per kilobyte (KB), or the like.

In one embodiment, a subscription may be renewed, and possibly adjusted, on a periodic basis, such as a monthly basis. Such subscriptions may be similar to cellular customer subscriptions, but may cost substantially less than a full-service cellular subscription.

In one embodiment, the "Discoverable Only," "Discover All" and "Discover" subscription types may be provided on the basis of a one-time payment, a periodic payment, or a payment for a predetermined number of discoveries, while the "Direct Access" and "Donor Direct Access" subscription types may be provided on the basis of up to a predetermined or unlimited amount of data to be transferred, costed out at a flat monthly rate or a rate per KB, or the like.

In various embodiments, restricting connection between devices based on subscription type facilitates the suppression of unwanted wireless connections within a local ad-hoc network. This results in improved spectral efficiency and power efficiency. Less energy is spent on communication since the unwanted connections are not maintained. Radio interference can also be reduced due to the reduction in connections.

By configuring the mix of devices with different subscription types, ad-hoc networks with different characteristics can be achieved. For example, configuring one device with a high-grade subscription such as "Discover All" and "Donor Direct Access" and configuring a number of other devices with low-grade subscriptions such as "Discoverable Only" results in a star network topology. Configuring all devices with the same mid-grade or high-grade subscription may result in a mesh network topology. Mixes of devices subscriptions may lead to hierarchical networks, with low-grade subscription devices operating as end nodes and/or backhaul nodes, and high-grade subscription devices operating as aggregation points.

In some embodiments, a device's subscription type may authorize it to connect only with a predetermined number of devices at a time. For example, a subscription type may specify that a device is discoverable while disconnected, but while it is connected to one other device it ceases to be discoverable. In this context, a connection may be defined as a state in which the two devices register each other's presence and potentially communicate with each other. Subscription costs may increase with the number of connections a device can make. In other embodiments, a device such as a device with a "Donor Direct Access" subscription may be configured to ignore devices which are already connected to a common ad-hoc network, thereby reducing connectivity within the network and associated costs.

In some embodiments, an authorized communication relationship between a first device and a second device is entered if and only if appropriate charging criteria are satisfied. Given that certain actions can only be completed after obtaining an authorization, and given that charges may be incurred for performing those actions, each of the devices may be configured only initiate those actions under certain conditions. For example, each of the devices may be configured to enter the authorized communication relationship if the charges that will be incurred (if any) are at or below an acceptable limit. The charges incurred may depend on the subscriptions held by one or both of the devices in the authorized communication relationship. For example, the first device may agree that all the charges, or all the charges up to a certain limit, are to be levied against its own account, while the second device may agree to entering the authorized communication relationship if and only if the charges that will be levied against its own account will be limited to a certain amount, possibly zero.

Authorization and Discovery

Embodiments of the present technology are configured to allow devices to discover and connect with each other, but this is subject to authorization from an appropriate wireless spectrum stakeholder, such as a mobile network operator (MNO) or other entity holding a license for use of the portion of radio spectrum via which the connection is to be made, or their authorized agent or representative, or the like.

Figure 1A:
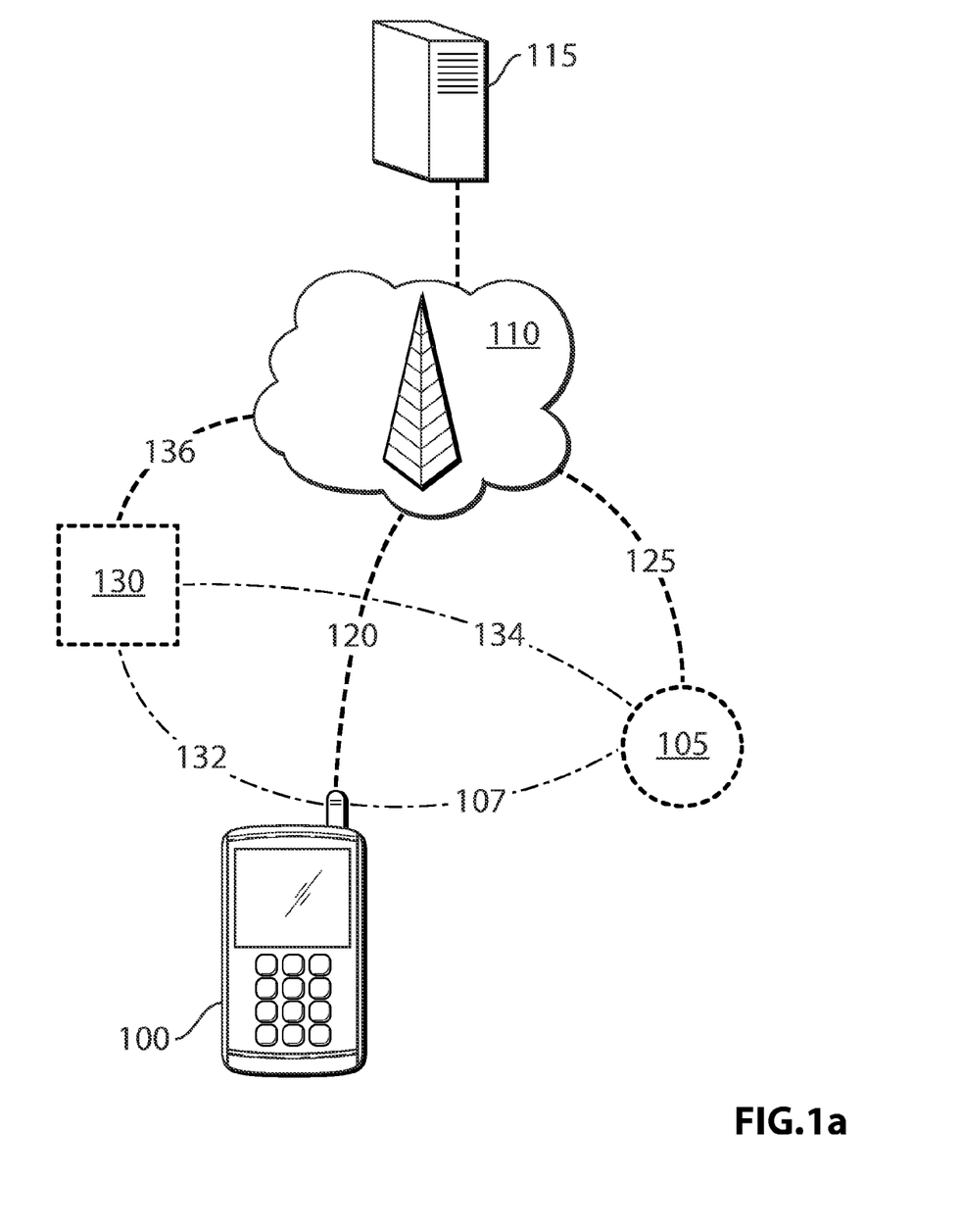
FIG. 1a illustrates a wireless communication network, in accordance with one embodiment of the technology.

FIG. 1a illustrates an example of a communication network, in accordance with an embodiment of the present technology. The network comprises a first device 100 and a second device 105, which are proximate to each other and capable of establishing a direct or local wireless communication link 107. For example, the first device may be a handheld mobile device such as a smartphone, PDA, laptop, tablet, or other user equipment, and the second device may be a wireless sensor, meter, or other machine-type device within direct communication range of the first device via a predetermined band of licensed radio spectrum. The network further comprises a MNO network 110, such as a wireless wide area network (WWAN), cellular data network, or the like. The network further comprises a validation server 115 accessible via the MNO network 110. The validation server is configured to receive, evaluate, and respond to (e.g. grant or deny) validation requests from the first and second device, as described in further detail below.

In one embodiment, illustrated by links 120 and 125, both of the first device 100 and the second device 105 are configured for communication with the MNO network 110. A device which is configured for communication with the validation server 115 and/or MNO network 110 may be referred to as a Gateway device herein. Each of the first device and the second device may then communicate directly with the MNO network 110, for example in order to contact the validation server 115. However, in some embodiments, communication with the MNO network may nevertheless be routed through one of the first device and the second device.

In one embodiment, only one of the first device 100 and the second device 105 is a Gateway device, in which case one of the links 120 and 125 is inoperative. The other one of the first device and the second device may then communicate with the validation server and/or MNO network by routing such communication through the Gateway device.

In one embodiment, neither of the first device 100 and the second device 105 is a Gateway device, in which case both of the links 120 and 125 are inoperative. This may be the case, for example, when the first device is a user interface device not holding an MNO subscription. An example of this may be an iPod Touch™ or similar device, modified to use licensed spectrum for local or direct communication only. In such embodiments, a separate Gateway device 130, for example integrated into a smartphone, tablet, computer, WWAN router, or the like, may be provided. Communication between the MNO network 110 and both the first device 100 and the second device 105 may then be routed through the Gateway device 130 and a communication link 136 between the Gateway device and the MNO network. The communication link between the first device 100 and the optional Gateway device 130 is shown as link 132, and the communication link between the second device 105 and the Gateway device 130 is shown as link 134.

It is to be understood that the above embodiments comprise a reduced number of devices for clarity; however more devices may be added. For example, plural separate or integrated Gateway devices may be provided, as well as more devices in local and/or direct communication, local relaying devices, repeaters, sensors and actuators in an ad-hoc local networking configuration, and the like. In one embodiment, a peer-to-peer network of devices in local communication may comprise one or more Gateway devices, and communication with the MNO network may be routed via a selected Gateway device. In the embodiment of FIG. 1a, the second device 105 may route communication with the MNO through the Gateway 130 rather than the first device, while the first device 100 may communicate directly with the MNO.

Figure 1B:
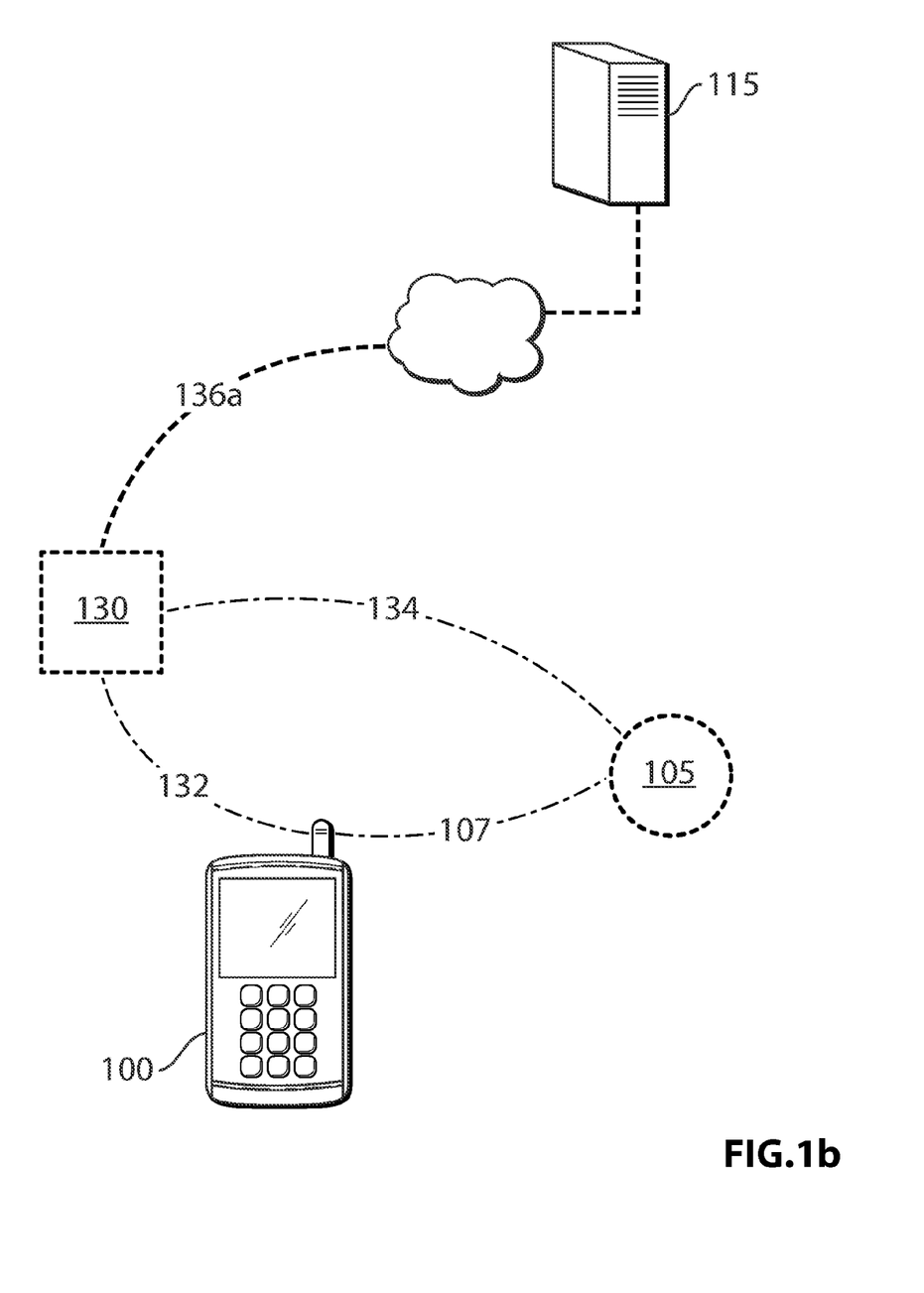
FIG. 1b illustrates a wireless communication network with an alternate link to the validation server, in accordance with one embodiment of the technology.

FIG. 1b illustrates a wireless communication network similar to FIG. 1a, but with an alternate communication link 136a from the Gateway device 130 to the validation server 115, in accordance with another embodiment of the technology. The alternate communication link 136a may be a wired link, optical link, satellite link, or other type of communication link, as would be readily understood by a worker skilled in the art. Although the links 120, 125, 136 and the MNO network 110 are not shown in FIG. 1b, they may also be provided. The communication link 136a may provide a connection to the Gateway device for facilitating validation operations, without necessarily requiring use of the MNO network. Such communications may be routed through an intermediate network such as the Internet, for example via an available Wi-Fi™ connection. Communication between the first and second devices and the validation server may be routed through the Gateway device and the communication link 136a.

Figure 2:
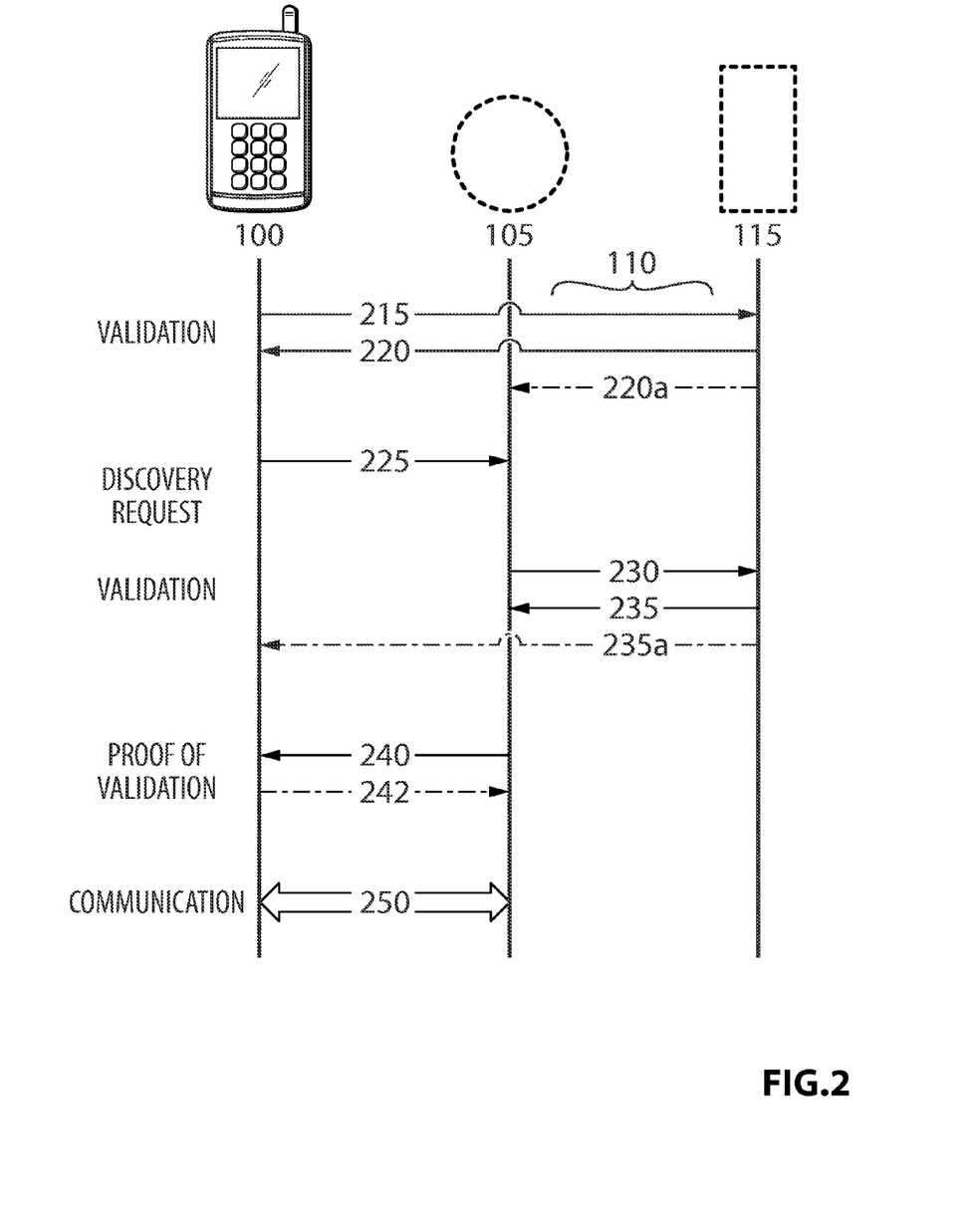
FIG. 2 illustrates an example of discovery between a first local device and a second local device, in accordance with an embodiment of the present technology.

FIG. 2 illustrates an example of discovery, by the first device 100, of the second device 105, in accordance with an embodiment of the present technology. Upon initiation, for example by a program or user, the first device 100 transmits a validation request message 215 to the validation server 115, for example accessible via the MNO network 110 or via another direct or indirect communication link. As described previously, the validation request message may be transmitted directly to the validation server, for example via the MNO network, via another network, or via a direct link, if the first device is a Gateway device, or it may be transmitted via another Gateway device, such as the second device or a third device in direct or local communication with the first device. The validation server then evaluates the validation request, for example by looking up an identifier contained in the request to determine whether the first device currently holds a valid subscription or right to use a portion of licensed radio spectrum under predetermined conditions. The validation server may use various other algorithms to evaluate the validation request, some of which would be readily understood by a worker skilled in the art. For example, Radius or Diameter protocols may be employed to provide services related to validation. The validation server 115, for example via the same communication path as the request, may then transmit a validation response message 220 to the first device 100. The validation response message 220 may be transmitted via the same path (but in the opposite direction) as the validation request message 215, or via a different path and/or Gateway device.

If the validation response message 220 is favourable (i.e. the subscription of the first device is validated), and if the validated subscription type allows the first device to perform discoveries (e.g. a Discover subscription or a Discover All subscription) the first device may proceed to transmit a discovery request 225. The validation response message may also include resource usage instructions and/or restrictions, for example indicating times, repetition rates, and communication frequencies to be used for transmission of discovery requests, optionally variable by geographic location. The discovery request 225 may be broadcast locally, and optionally picked up and relayed by local devices. Discovery requests may be made over a predetermined broadcast channel, which other devices are configured to listen to. The broadcast channel may utilize licensed radio spectrum. The discovery request 225 may also include information regarding which subscription types can be discovered. For example, the discovery request may indicate that devices with one or more of: Discoverable Only subscriptions, Discover subscriptions, and Discover All subscriptions should respond to the current discovery request, as the first device is not currently authorized to discover devices with other types of subscriptions.

In some embodiments, discovery requests may be made periodically, randomly, or in accordance with a schedule, or the like. A single validation operation from the first device may be followed by multiple discovery requests, for example in order to keep knowledge of the local network current. As new devices join the local network, they may respond to discovery requests and be validated in order to join the network.

Upon receipt of the discovery request 225, the second device 105 is configured to transmit a validation request message 230 to the validation server 115. As described previously, the validation request message 230 may be transmitted directly to the validation server, for example via the MNO network, if the second device is a Gateway device, or it may be transmitted via another Gateway device, such as the first device or a third device in direct or local communication with the second device. The validation server then evaluates the request, for example by looking up an identifier contained in the request to determine whether the second device currently holds a valid subscription or right to use a portion of licensed radio spectrum under predetermined conditions. The validation server 115, for example via the same communication path as the request, may then transmit a validation response message 235 to the second device 105. The validation response message 235 may be transmitted via the same path (but in the opposite direction) as the validation request message 230, or via a different path and/or Gateway device.

It should be noted that Gateway devices may be configured to forward validation requests from other devices to the validation server, for example via the MNO network, even though those devices have not yet been validated. However, other types of messages, for example addressed to local or remote devices, may be ignored or explicitly rejected. Various devices such as Gateway devices may thus be configured to differentiate between validation messages and non-validation messages, and to treat each message type differently.

After the second device has received the validation response message 235, the second device may provide proof of validation to other devices as needed. Proof of validation may be conveyed via a proof-of-validation message, for example comprising a key, certificate, or other type of verifiable token of authorization. For example, the second device may transmit a proof-of-validation message 240 to the first device 100, which may be a Gateway device, and optionally to a separate Gateway device 130. Similarly, in some embodiments, the first device may transmit a proof-of-validation message to one or more other devices, for example proof-of-validation message 242. In some embodiments, the first device may query the validation server 115 to obtain proof of validation of the second device, and the validation may be configured to provide a response as to whether the second device has been validated or not.

Following validation and proof of validation, the first device and the second device may enter into an authorized communication relationship 250. The authorized communication relationship is a wireless communication relationship using licensed spectrum, which has been authorized by an appropriate spectrum stakeholder, for example via the validation server. For example, in the authorized communication relationship, the first device and the second device may communicate operational messages and/or data to and/or from each other via radio channels falling at least partially within licensed spectrum. Operational messages may comprise queries, responses, commands, and the like. Operational data may comprise telemetry, configuration data, and the like. The operational communication relationship may generally be used to support applications, such as user applications, sensor or meter monitoring applications, data synchronization applications, other networking applications, and the like, as would be readily understood by a worker skilled in the art.

In some embodiments, entry into the authorized communication relationship 250 may further comprise network discovery operations, as would be readily understood to a worker skilled in the art. For example, network discovery operations may comprise each device internally registering details regarding the availability of the authorized communication link, along with internal means for accessing the authorized communication link in order to support higher level processes, such as processes present in application, presentation and/or session layers.

In some embodiments, the authorized communication relationship 250 may be subject to one or more predetermined conditions, such as transmit power conditions, bandwidth conditions, spread spectrum behaviour conditions, time limitations, and the like. Such predetermined conditions may be pre-programmed, or negotiated or provided during validation.

In some embodiments, instead of or in addition to the validation server transmitting validation response messages to the requestor, the validation server may transmit validation response messages to other devices. These validation response messages may be sent without requiring an explicit request from the other devices, or they may be sent in response to queries transmitted by one or more of the other devices. For example, in the scenario depicted in FIG. 2, instead of or in addition to the validation response message 235, an alternate validation response message 235a may be transmitted to the first device 100. The second device may proceed without requiring a validation response message, but the first device will reject communication from the second device unless the validation response message indicates that the second device holds a valid and appropriate subscription. This may avoid some relaying of validation responses, for example if only Gateway devices are made responsible for enforcing validation responses received from the validation server. Similarly, an alternate validation response message 220a may be sent to the second device 105 instead of or in addition to the validation response message 220.

Subscription Donation

In some embodiments, if a first Gateway device is unable to connect to the MNO network, for example wirelessly or otherwise, it may be configured to connect to a second local device (for example a sensor device) which has adequate radio hardware for connecting to the MNO network. The first Gateway device may donate its stored subscription information to the second local device. The second local device may then use the subscription information in establishing a connection to the MNO network.

In some embodiments, the second local device, such as a sensor device, may utilize the subscription information in order to connect itself directly to the MNO network. It may then upload and/or download information directly via the MNO network.

In some embodiments, the second local device is capable of acting as an alternate Gateway device for accessing the validation server, for example via the MNO network. In this case, the second local device may be configured to operate as a Gateway device for other devices in the local network. Data may then be routed to and/or from the validation server and/or the MNO network via the alternate Gateway device instead of via the first Gateway device.

In this way, a single subscription may be used to connect to the MNO network via one of a plurality of redundant physical channels. This may increase connectivity when, for example, some Gateway-capable devices are in a location which is unfavourable to long-range communication to the MNO network, or when the power reserves of a first battery-operated Gateway drop below a predetermined threshold, indicating that an alternate Gateway should be chosen.

In some embodiments, a first device may donate some of its subscription capabilities to another device if the first device holds a specific subscription, such as a "Donor Direct Access" subscription. The Donor Direct Access subscription may allow a first device to send and/or receive data from another device regardless of whether the other device has a direct access subscription. Communication to a device not holding a direct access subscription may be charged at a different rate.

Sharing Device Identifiers

In some embodiments, plural wireless devices may be configured to share one or more identifiers, such as SIM identities, usable for identification purposes with the MNO network. The wireless devices may be configured to utilize one or more transferrable identifiers which may be initially stored locally within at least one wireless device or remotely on a server.

In some embodiments, transfer of a device identifier may be used in place of subscription donation. For example, instead of donating a subscription from one device to another as detailed above, a device identifier may be transferred to a device which holds a subscription.

In some embodiments, only one device, such as a Gateway device, is required to have a SIM or other identifier necessary for communication with existing MNO infrastructure. Communication with the MNO by a plurality of devices, for example for subscription validation purposes, may be routed through this one device. Other devices may simply hold arbitrary identifiers or subscription serial numbers, or the like.

Levying Charges

Embodiments of the present technology are configured to facilitate levying of charges by a spectrum stakeholder, such as a MNO and/or spectrum licensee or an agent acting on their behalf. A device owner or operator may be charged for operations, such as discovery and data communication operations involving that device, when the device utilizes licensed spectrum or unlicensed spectrum. Charges may be registered against an account held in the name of the device owner. The account may be configured according to a predetermined plan. Various plans may be utilized as would be readily understood by a worker skilled in the art. For example, pay-per-use plans, plans including a predetermined number of included communication operations of each type, with communication operations over and above this number generating additional charges, flat rate plans, and the like. To track charges, each device may transmit a substantially unique identifier with its validation request, and this identifier may be associated with a certain device owner and/or account.

In various embodiments of the present technology, one or more device operations may generate charges, for example applied by the MNO against an account held by an owner or operator of the device. In some embodiments, a charge may be generated when the device discovers another device. For example, this charge may be levied once per successful discovery request, once per device discovered, or the like. In some embodiments, a charge may be generated when the device is discovered by another device. For example, this charge may be levied for example once per predetermined interval of time. In some embodiments, the device may be charged for both discovering another device and being discovered. In some embodiments, a charge may be generated when the device transmits data to another device. For example, this charge may be levied for example once per unit of data transmitted, and may increase if the data is transmitted to more than one other device. In some embodiments, a charge may be generated when the device receives data from another device. For example, this charge may be levied for example once per unit of data received. In some embodiments, the device may be charged for both sending data and receiving data.

In some embodiments, a first device may be configured to be discoverable only by other devices which are explicitly or implicitly responsible for charges payable for discovery operations by the first device. For example, the first device may be discoverable by a second device once an assurance is given that the second device will pay for MNO charges generated by the first device being discovered. The second device may thus be charged for both the event of discovery and the event of being discovered. This configuration may be based on MNO policy and/or user choice. Evaluating of assurances may be done at the validation server, for example by looking up stored account settings for the devices.

In some embodiments, a first device may be configured to communicate only with other devices which are explicitly or implicitly responsible for charges payable for communication operations by the first device. For example, the first device may send and/or receive data to and/or from the second device once an assurance is given that the second device will pay for MNO charges generated by the first device related to data communication. The second device may thus be charged for both communication to and/or from itself as well as communication to and/or from the first device. This configuration may be based on MNO policy and/or user choice. Evaluating of assurances may be done at the validation server, for example by looking up stored account settings for the devices.

Devices

Embodiments of the present technology comprise one or more electronic devices or a networked system of such devices. Various devices are briefly described below.

A validation server may be a computer server, a collection of servers, or a virtual server, as would be readily understood by a worker skilled in the art. A server typically comprises a communication module configured to send and receive messages, a processing module configured to execute validation operations, and a memory module configured to store data such as subscription data. The validation server may be communicatively coupled to the MNO network via a connection such as an optical connection or wired connection. The validation server may additionally or alternatively be reachable via other means, for example via another wired network, satellite network, the Internet, or a combination thereof, or the like. A validation server may be a function of an existing server within an MNO network, or it may sit outside the MNO network. A validation server typically receives, evaluates and responds to validation requests from a variety of devices within a predetermined territory.

An MNO network may be a wireless communication network servicing client devices via licensed radio spectrum. MNO networks may include cellular networks using technology such as CDMA, UMTS, GSM, LTE, or the like. MNO networks may include other types of networks having an infrastructure comprising wireless base stations, a core network, and the like. Devices used in implementation of an MNO network would be readily understood by a worker skilled in the art.

A device capable of establishing local and/or direct wireless communication links via licensed spectrum may be an electronic device comprising a radio module capable of local and/or direct communication via a portion of licensed spectrum and via a predetermined communication protocol set. The device further comprises a computer processor configured, at least in part, to perform validation management operations, such as managing sending and receipt of validation messages and responding appropriately. Such devices may be self-contained sensors, actuators, user devices such as smartphones or other handheld computing devices, communication peripherals configured for operative coupling to another device such as a television, computer, or LAN, or the like.

A radio capable of local and/or direct communication via licensed spectrum may be a mobile radio capable of communication with an MNO network, as would be readily understood by a worker skilled in the art, the radio further configured, as directed by the host device, to form direct and/or local wireless communication links with proximate devices, for example within a 100 m range or other appropriate range, as would be readily understandable to a worker skilled in the art. The radio may operate at lower transmit power when communicating with proximate devices. Alternatively, the radio may be capable of forming direct and/or local wireless communication links, but not capable of forming longer range links, for example for communication with the MNO network. Local and/or direct communication may utilize a different (for example simplified) protocol set in comparison to communication with the MNO network.

A Gateway device is device capable of establishing local and/or direct wireless communication links via licensed spectrum, and which is also capable of establishing communication with the validation server, for example via the MNO network, and/or via a longer-range radio functionality. In some embodiments, the Gateway device may be capable of establishing communication with the validation server via another wired link, another type of wireless link, an optical link, a satellite link, or the like, or a combination thereof. The Gateway device may further be configured to act as a relay, forwarding messages between the validation server and/or MNO network and other proximate devices in local and/or direct communication with the Gateway device. The Gateway device may comprise a single radio capable of both local and/or direct communication and communication with the validation server and/or MNO network, or the Gateway device may comprise separate radios for each functionality.

It will be appreciated that, although specific embodiments of the technology have been described herein for purposes of illustration, various modifications may be made without departing from the spirit and scope of the technology. In particular, it is within the scope of the technology to provide a computer program product or program element, or a program storage or memory device such as a solid or fluid transmission medium, magnetic or optical wire, tape or disc, or the like, for storing signals readable by a machine, for controlling the operation of a computer according to the method of the technology and/or to structure some or all of its components in accordance with the system of the technology.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Acts associated with the method described herein can be implemented as coded instructions in plural computer program products. For example, a first portion of the method may be performed using one computing device, and a second portion of the method may be performed using another computing device, server, or the like. In this case, each computer program product is a computer-readable medium upon which software code is recorded to execute appropriate portions of the method when a computer program product is loaded into memory and executed on the microprocessor of a computing device.

Further, each step of the method may be executed on any computing device, such as a personal computer, server, PDA, or the like and pursuant to one or more, or a part of one or more, program elements, modules or objects generated from any programming language, such as C++, Java, PL/1, or the like. In addition, each step, or a file or object or the like implementing each said step, may be executed by special purpose hardware or a circuit module designed for that purpose.

The technology will now be described with reference to specific examples. It will be understood that the following examples are intended to describe embodiments of the technology and are not intended to limit the technology in any way.

EXAMPLES

Example 1

Figure 3:
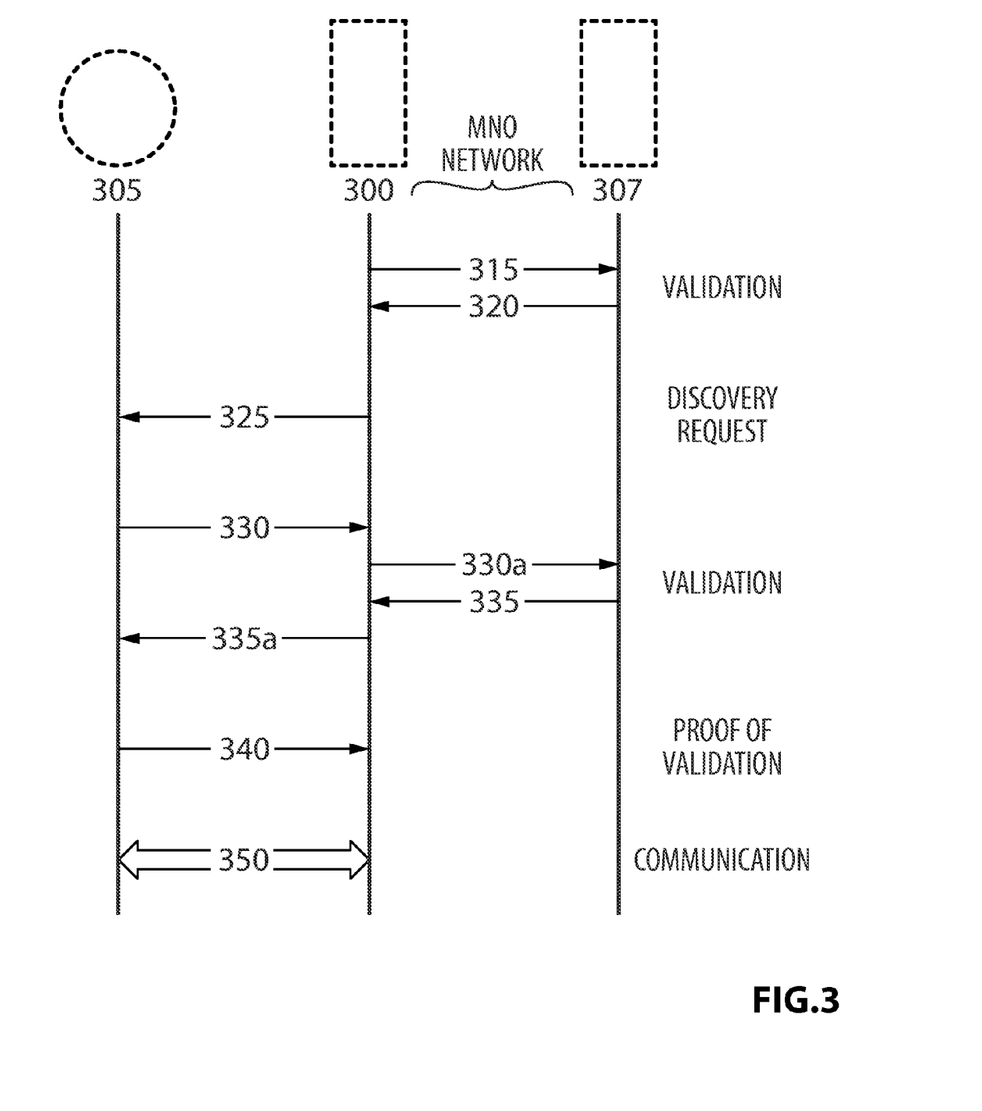
FIG. 3 illustrates an example of discovery between a Gateway device and a Sensor UE device, in accordance with an embodiment of the present technology.

FIG. 3 illustrates another example of discovery, between a Gateway device 300 and a Sensor UE device 305, in accordance with an embodiment of the present technology. In terms of FIG. 1a, the Gateway device 300 may correspond to the first device 100 (including an integrated Gateway), and the Sensor UE device 305 may correspond to the second device 105. The optional external Gateway device 130, and optional links 125, 132, 134 and 136 are deleted.

Upon initiation, for example by a program or user, the Gateway device 300 connects directly to the MNO network via a WWAN subscription and transmits a validation request message 315 to a validation server 307. The validation server then evaluates the validation request. The validation server then transmits a validation response message 320 to the Gateway device 300, via the MNO network. Various subscription validation methods may be used as would be readily understood to a worker skilled in the art.

If the validation response message 320 is favourable (i.e. the subscription of the first device is validated), and if the validated subscription type allows the first device to perform discoveries (e.g. a Discover subscription or a Discover All subscription) the Gateway device may proceed to periodically transmit discovery requests, for example once every 15 minutes. Each discovery request includes information regarding which subscription types can be discovered. At least one such discovery request 325 may be received by the Sensor UE device 305.

Upon receipt of the discovery request 325, the Sensor UE device 305 is configured to transmit a validation request message 330 to the validation server 307. A validation request message 330 may be transmitted via the Gateway device 300, which is configured to forward messages related to validation (but not other messages until validation has been completed). The Gateway device 300 thus receives the validation request message 330 and forwards it to the validation server as forwarded validation request message 330a. Alternatively, the validation requests message may be transmitted directly via the MNO network if the Sensor UE device is capable of connecting directly to the MNO. The validation server then evaluates the request. The validation server 307 may then transmit a validation response message 335 to the Sensor UE device 305. The validation response message 335 may be transmitted via the same path as the validation request message 330. For example, the Gateway device 300 may receive the validation response message 335 and forward it to the Sensor UE device as forwarded validation response message 335a.

After the Sensor UE device has received the validation response message 335a, it may provide proof of validation (e.g. via a key or certificate) to the Gateway device via a proof-of-validation message 340.

Following validation and proof of validation, the Gateway device 300 and the Sensor UE device 305 may enter into an authorized communication relationship 350. This may require initiation of a network discovery operation, for example.

Example 2

Figure 4:
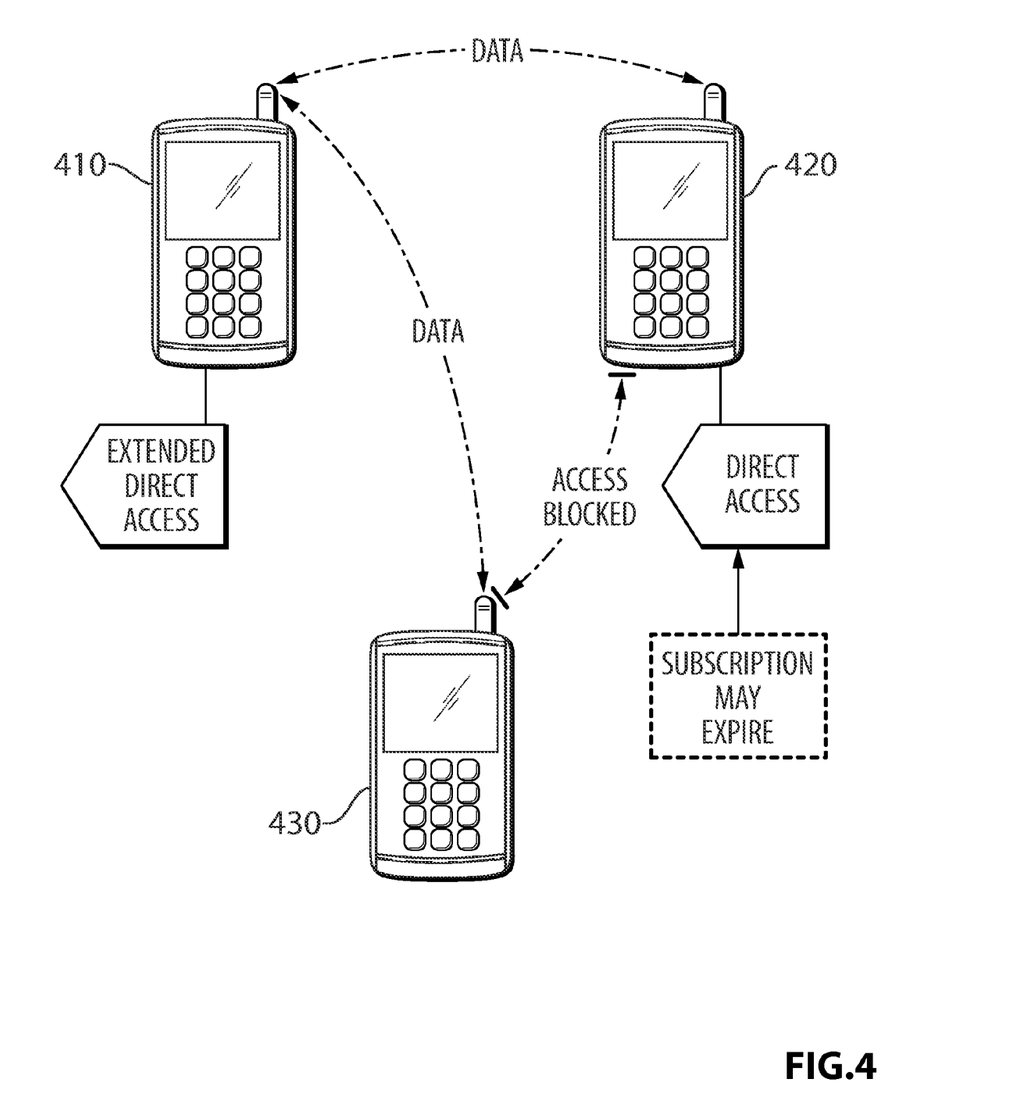
FIG. 4 illustrates an example of data communication between devices in accordance with various types of subscriptions, in accordance with an embodiment of the present technology.

As described herein, a device may hold an "Extended Direct Access" subscription or a "Direct Access" subscription, each of which may be validated by the validation server through a request/response operation. With reference to FIG. 4, a first device 410 is configured with an Extended Direct Access subscription. A second device 420 is configured with a Direct Access subscription, and a third device 430 is configured without a Direct Access subscription. The second device 420 and the third device 430 subsequently complete discovery operations, subject to their subscription restrictions. However, the second device 420 and the third device 430 are inhibited from communicating data between each other via a direct wireless communication link and possibly also via a local wireless communication link, since the third device 430 does not hold the requisite subscription. In some embodiments, this may be so even if the third device holds a subscription which allows it to be discovered but does not allow for data communication.

The first device 410 and the third device 430 also complete discovery operations, subject to their subscription restrictions. Data communication between the first device 410 and the third device 430 is then allowed since the first device 410 holds an Extended Direct Access subscription, even though the third device does not hold either an Extended Direct Access subscription or a Direct Access subscription. This is by virtue of the capabilities conferred to the first device 410 by its subscription.

Similarly, the first device 410 and the second device 420 complete discovery operations, subject to their subscription restrictions. Data communication between the first device 410 and the second device 420 is then allowed. The full capability of the Extended Direct Access subscription of the first device 410 need not be used, and for this reason charges for subscription usage by the first device may be lowered, or the first device may use up subscription credits at a lower rate, or the like.

In addition, if the Direct Access subscription held by the second device 420 expires or runs out, the "Extended" capability of the first device's 410 subscription may allow for further communication. However, charges for subscription usage by the first device 410 may be increased in this case.

It will be noted that the first device 410 is linked to both the second device 420 and the third device 430. In some embodiments, the first device 410 may thus act as a communication relay between the second device 420 and the third device 430. Additional charges may be levied for such relaying. In some embodiments, the first device 410 may be inhibited from acting as such a communication relay. In some embodiments, whether the first device 410 can be used as a relay may depend on the subscription type, subscription details, and the like.

Example 3

The following use case illustrates potential operation of the present technology. A home owner has a Gateway device installed in his home. The Gateway device supports Wireless Wide Area Networking (WWAN) via an MNO, Personal Area Networking (PAN) via unlicensed radio communication, and a version of LTE Direct local and/or direct wireless communication via licensed spectrum, or an equivalent. The owner may pay a monthly fee for limited WWAN access and unlimited LTE Direct access. This allows the Gateway device to connect with the MNO via WWAN, and registers a Discover All subscription and a Extended Direct Access subscription for the Gateway device. A remote validation server is provided with an identifier of the Gateway device and the subscription details, so that it may validate requests appropriately.

The owner may also buy several inexpensive devices, such as wireless sensors, for installation around the home. Different wireless sensors may be purchased from different manufacturers. Sensors may be used as part of one or more of a security system, water monitoring, power usage monitoring or metering, and the like. In the present example, the owner does not need to set up a wireless account for each device. Rather, the manufacturer may ship the devices with a minimal subscription, for example a Discoverable Only subscription, which may be at no cost to the manufacturer.

Each of the inexpensive devices may be configured to connect via PAN to the Gateway device, if possible. If such a connection is not possible or later fails, the devices may be configured to switch over to connect to the Gateway device via LTE Direct. This may be due to range or coverage limitations, for example. Communication setup with the inexpensive devices may be seamless from a point of view of the owner. That is, the owner does not need to necessarily specify whether connection should be via PAN or LTE Direct. Uses of LTE Direct are subject to one-time or periodic validation as described herein.

At least one inexpensive device (sensor) may be configured for automatic failover from PAN communication to LTE Direct communication. For example, if one day a neighbour sets up a video baby monitor on the unlicensed band, disrupting many of the PAN connections, the devices (sensors) may be configured to automatically switch over to communication via LTE Direct, which it is expected will not be so degraded as it will use licensed spectrum. This may occur seamlessly and without the owner's knowledge.

It is obvious that the foregoing embodiments of the technology are examples and can be varied in many ways. Such present or future variations are not to be regarded as a departure from the spirit and scope of the technology, and all such modifications as would be obvious to one skilled in the art are intended to be included within the scope of the following claims.

We claim:

1. A method for establishing a wireless communication relationship between a first device and a second device, the wireless communication relationship established at least in part via a portion of licensed radio spectrum, the method comprising:
   a) contacting a remote validation server to obtain a validated authorization to use the portion of licensed radio spectrum for radio communication;
   b) communicating proof of the authorization between the first device and the second device; and
   c) causing the first device and the second device to enter into the wireless communication relationship via a local wireless communication link upon obtaining the validated authorization and communicating said proof of the authorization, wherein the local wireless communication link includes the portion of licensed radio spectrum;
   wherein the portion of licensed radio spectrum is licensed to an operator of a mobile network, and wherein the local wireless communication link, including the portion of the licensed radio spectrum, is separate from infrastructure devices of the mobile network.

2. The method according to claim 1, the method further comprising:
   d) transmitting a discovery request from the first device, the discovery request including an indication of an authorization level of the first device;
   e) receiving the discovery request at the second device; and
   f) making a determination at the second device whether to respond to the discovery request, wherein said determination is based on an evaluation of the received authorization level in combination with a stored authorization level of the second device.

3. The method according to claim 1, the method further comprising:
   d) determining an authorization level of the first device;
   e) determining an authorization level of the second device; and
   f) making a determination of whether to respond to a discovery request prior to entering the wireless communication relationship, or whether to transmit data between the first device and the second device, or both, said determination based at least in part on an evaluation of the authorization level of the first device in combination with the authorization level of the second device.

4. The method according to claim 3, wherein the authorization level of the first device implicitly or explicitly specifies a set of potential authorization levels of the second device which, following said evaluation, will result in the determination being made to enter the wireless communication relationship.

5. The method according to claim 4, wherein each of the potential authorization levels correspond to a type of subscription corresponding to the second device.

6. The method according to claim 3, wherein the wireless communication relationship is entered if charges levied against an account registered to the first device for entering the wireless communication relationship are at or below a first predetermined threshold, and charges levied against an account registered to the second device for entering the wireless communication relationship are at or below a second predetermined threshold.

7. The method according to claim 6, wherein the first predetermined threshold is different from the second predetermined threshold.

8. The method according to claim 6, wherein the first predetermined threshold is greater than zero and the second predetermined threshold is zero.

9. The method according to claim 3, further comprising, in response to contacting the remote validation server, charging an account associated with the first device or the second device.

10. The method according to claim 1, wherein the wireless communication relationship comprises a relationship in which the first device and the second device are capable of discovering each other.

11. The method according to claim 1, wherein the wireless communication relationship comprises a relationship in which the first device and the second device are capable of transferring data between each other.

12. The method according to claim 1, the method further comprising levying a charge against one or both of: an account registered to the first device; and an account registered to the second device, said charge being levied in response to one or more events selected from the group comprising: the first device discovering the second device; the first device being discovered by the second device; the first device transmitting data to the second device; and the first device receiving data from the second device.

13. A system for facilitating a controlled wireless communication relationship between wireless devices, the system comprising:
   a) a first wireless device configured for wireless communication at least in part via a portion of licensed radio spectrum;
   b) a second wireless device configured for wireless communication with the first wireless device at least in part via the portion of licensed radio spectrum;
   c) a remote validation server associated with a licensed radio spectrum stakeholder, the validation server configured to receive, evaluate and respond to validation requests from the first wireless device and the second wireless device;
   the first and second wireless devices further configured to: contact the remote validation server to obtain validated authorizations to use the portion of licensed radio spectrum for radio communication; communicate proof of the authorization between the first device and the second device; and enter into the controlled wireless communication relationship via a local wireless communication link upon obtaining the validated authorization and communicating said proof of the authorization, wherein the local wireless communication link includes the portion of licensed radio spectrum;
   wherein the portion of licensed radio spectrum is licensed to an operator of a mobile network, and wherein the local wireless communication link, including the portion of the licensed radio spectrum, is separate from infrastructure devices of the mobile network.

14. The system according to claim 13, wherein the system is further configured to:
   d) determine an authorization level of the first device;
   e) determine an authorization level of the second device; and
   f) make a determination of whether to respond to a discovery request prior to entering the wireless communication relationship, or whether to transmit data between the first device and the second device, or both, said determination based at least in part on an evaluation of the authorization level of the first device in combination with the authorization level of the second device.

15. The system according to claim 14, wherein the authorization level of the first device implicitly or explicitly specifies a set of potential authorization levels of the second device which, following said evaluation, will result in the determination being made to enter the wireless communication relationship.

16. The system according to claim 15, wherein each of the potential authorization levels correspond to a type of subscription corresponding to the second device.

17. The system according to claim 14, wherein the wireless communication relationship is entered if charges levied against an account registered to the first device for entering the wireless communication relationship are at or below a first predetermined threshold, and charges levied against an account registered to the second device for entering the wireless communication relationship are at or below a second predetermined threshold.

18. The system according to claim 14, the system further configured, in response to contacting the remote validation server, charging an account associated with the first device or the second device.

19. The method according to claim 1, the method further comprising levying a charge against one or both of: an account registered to the first device; and an account registered to the second device, said charge being levied in response to one or more events selected from the group comprising: the first device discovering the second device; the first device being discovered by the second device; the first device transmitting data to the second device; and the first device receiving data from the second device.

20. A non-transitory computer program product comprising a computer readable memory storing computer executable instructions thereon that when executed by a computer perform operations for establishing a wireless communication relationship between a first device and a second device, the wireless communication relationship established at least in part via a portion of licensed radio spectrum, the operations comprising:
  a) contacting a remote validation server to obtain a validated authorization to use the portion of licensed radio spectrum for radio communication;
  b) communicating proof of the authorization between the first device and the second device; and
  c) causing the first device and the second device to enter into the wireless communication relationship via a local wireless communication link upon obtaining the validated authorization and communicating said proof of the authorization, wherein the local wireless communication link includes the portion of licensed radio spectrum;
wherein the portion of licensed radio spectrum is licensed to an operator of a mobile network, and wherein the local wireless communication link, including the portion of the licensed radio spectrum, is separate from infrastructure devices of the mobile network.

* * * * *